(12) United States Patent
Nemoto

(10) Patent No.: US 6,584,180 B2
(45) Date of Patent: Jun. 24, 2003

(54) AUTOMATIC VOICE RESPONSE SYSTEM USING VOICE RECOGNITION MEANS AND METHOD OF THE SAME

(75) Inventor: Kazuo Nemoto, Kawasaki (JP)

(73) Assignee: International Business Machines Corp., Armonk, NY (US)

( * ) Notice: Subject to any disclaimer, the term of this patent is extended or adjusted under 35 U.S.C. 154(b) by 173 days.

(21) Appl. No.: 09/761,146

(22) Filed: Jan. 16, 2001

(65) Prior Publication Data
US 2001/0010714 A1 Aug. 2, 2001

(51) Int. Cl.$^7$ ............................ G10L 15/22; H04M 1/64
(52) U.S. Cl. .................... 379/88.01; 704/275; 704/251; 704/252; 379/88.16
(58) Field of Search .................... 379/88.01, 88.04, 379/88.16; 704/270.1, 275, 251, 252, 270, 200, 201

(56) References Cited

U.S. PATENT DOCUMENTS 5,485,508 A * 1/1996 Ho ........................ 379/102.02
6,223,158 B1 * 4/2001 Goldberg .................... 704/252
6,226,361 B1 * 5/2001 Koyama .................. 379/88.07
6,334,103 B1 * 12/2001 Surace et al. ............... 704/257
6,408,272 B1 * 6/2002 White et al. ............. 704/270.1

* cited by examiner

Primary Examiner—Fan Tsang
Assistant Examiner—Ming Chow
(74) Attorney, Agent, or Firm—kARL O. Hesse

(57) ABSTRACT

An automatic voice response section transfers voice input from a caller to a voice recognition section, and the voice recognition section generates a voice recognition result. The voice recognition result is synthesized at the voice response section into a voice confirmation message and sent back to the caller for confirmation that the voice input was correctly recognized. When a response by the caller to the confirmation message is negative, the automatic voice response section plays the previously received voice input from the caller as audio to a screener interface. A screener listens to the audio and enters a screener recognition result at the screener interface. The screener recognition result is synthesized into a voice response message by the voice response unit and transmitted to the caller for confirmation. Only if the caller responds negatively to the message based upon the screener recognition result is the call switched to an operator for manual handling of the callers special problems.

17 Claims, 3 Drawing Sheets

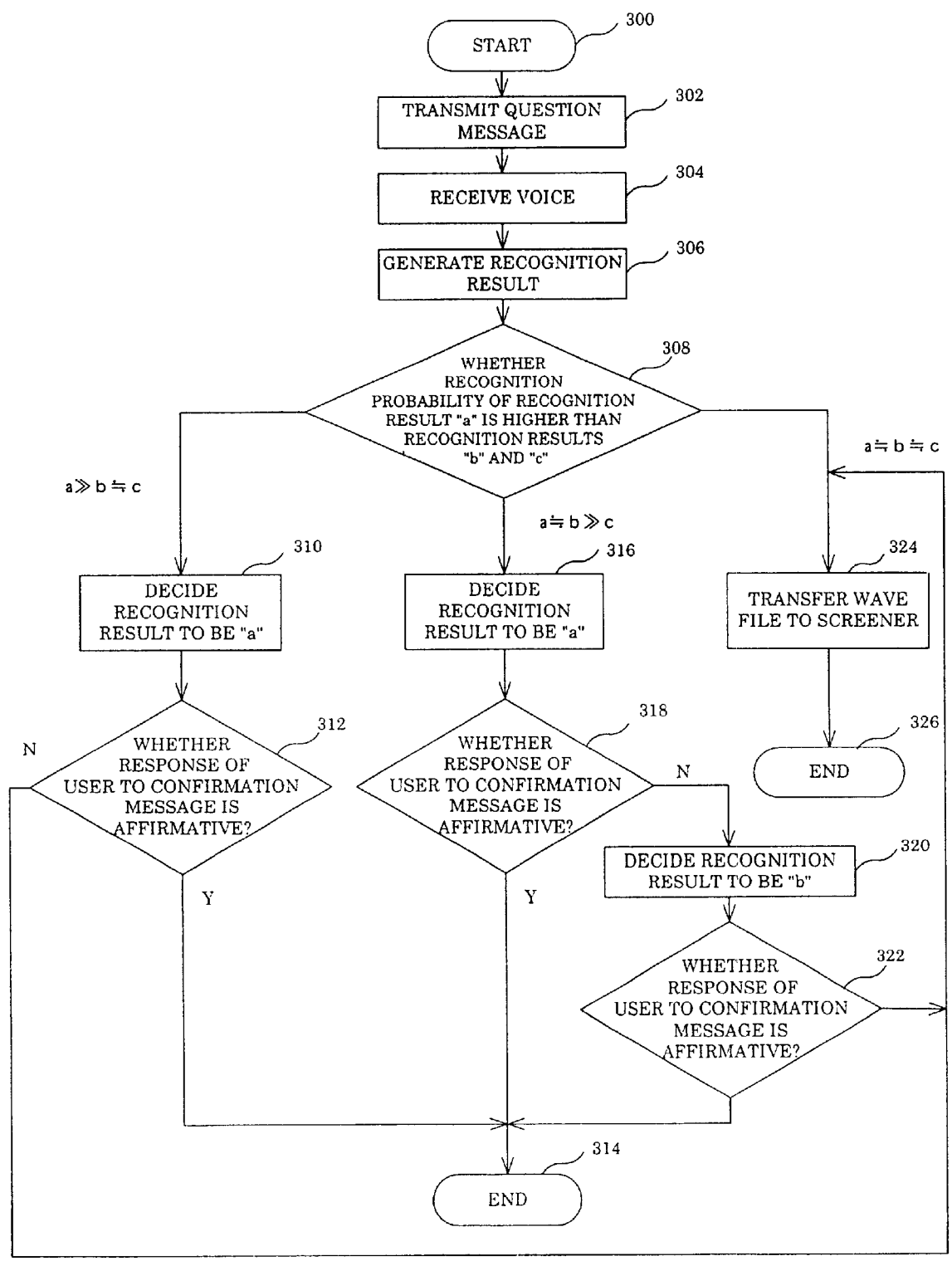

AUTOMATIC VOICE RESPONSE SYSTEM USING VOICE RECOGNITION MEANS AND METHOD OF THE SAME

BACKGROUND OF THE INVENTION

The present invention relates to automatic voice interaction systems such as call centers and computer systems which include voice recognition means and voice response means and to methods of their use.

Highly precise and inexpensive voice recognition means such as voice recognition software which operates in computers such as "ViaVoice" developed by IBM, Ltd. has recently become available, and an automatic voice response system using such voice recognition means has been suggested. An example of such an automatic voice interaction system includes a call center system which deals with customers who call the system to perform telephone shopping. Instead of a human operator, the shopping customer interacts with a computer through a voice recognition means and a voice response means to place an order for goods and/or services using voice communication.

In such telephone shopping systems in particular, large numbers of telephone calls to the call center are often made on the same day, and hence a large number of operators are required. By the use of the apparatus, computer program and method of the instant invention, the number of operators required for telephone shopping can be advantageously reduced. Generally, in such an automatic voice interaction system, a telephone shopping customer for example, herein after referred to as the caller, responds to an order question generated by a voice response means of a computer that took the call from the caller. The callers response to the system order question is provided to a voice recognition means and a recognition result is generated as text or an equivalent form of order information in the computer. This text is then synthesized into a voice form by the voice response means and sent to the caller in the form of an order confirmation question. Then, a caller is allowed to confirm the order to the computer through the voice recognition means.

The voice recognition steps in this method may fail owing to various kinds of causes such as the level of precision of the voice recognition means, tone quality and intonation of the caller, or a voice interpretation mistake by either the caller or the voice recognition means, perhaps due to noises generated around the customer. In this case, the caller is requested to utter the order information again. When in the example voice interaction system, the voice recognition fails repeatedly for a predetermined number of times, for example, three times, a private branch exchange switches the caller telephone connection so that the caller can speak with a human operator. Because the precision of presently employed voice recognition means is not 100% reliable, and because some callers can not interact effectively without the amenities of personal human conversation, sometimes called small talk, a human operator who can pick up on a telephone shopping call to an automatic voice interaction system is essential.

Current voice recognition means show a reasonable recognition accuracy in obtaining one item of order information from a caller when the machine has the opportunity to perform repeated recognition operations interleaved with voice response confirmation questions to the caller. When a larger number such as for example, four different order information items are required, the information capture accuracy is degraded. For example, when a caller must enter four items including a name of a bank to which money is transferred, a name of a bank's branch, a sum of money and a transfer date, all by telephone voice communication to voice recognition means, the probability of completing the information input without switching from an automatic voice interaction system to a human operator is 0.9×0.9× 0.9×0.9=0.6561. In other words, nearly 35% of the callers drop out from the automatic voice interaction process before they reach the completion of the order processing, and a human operator must deal with the caller's order instead of the automatic system. To be more specific, although there is some advantage to be obtained in adopting an interactive automatic voice response system, the automatic voice response system can not achieve total unmanned operation. In other words with the accuracy assumed above, about 100 lines can be supported by 34 operators. One reason that a better automated rate can not be achieved is that once an operator intervenes in a call being inadequately processed by an automated system, it is difficult for the operator to return the call to the automated system without creating caller dissatisfaction. Customer satisfaction seems to require that once an operator starts dealing with a caller, the call must continue to be handled on a manual basis and that requires a certain amount of time. Intervention by an operator who takes over a call when the caller is having difficulty with an automated system only seems to confirm in the callers mind that the automated system does not or can not work properly and further reduces the callers patience when requested to deal with repeated confirmation questions asked by an automated system using voice response means.

U.S. Pat. No. 6,044,142 issued to Hammerstrom et al attempts to solve this problem by switching a call to an operator for special assistance and then returning the call to their "intelligent network services". This sounds good but the caller of Hammerstrom is aware of the operator intervention and will resist being shunted back into the computer system.

SUMMARY OF THE INVENTION

An advantage of the present invention is that it reduces the number of times that an operator must take over a call being inefficiently handled by an automated system while at the same time reducing the number of times that a caller is asked to repeat uttering information needed by the automatic system.

Another advantage of the present invention is that it allows human intervention into the automated information gathering process without alerting a caller that such intervention is occurring. Accordingly the caller is not in a position to expect further manual communication with a human operator and caller satisfaction is not degraded. Actually, caller satisfaction is more likely to be enhanced because an order for example may be expeditiously completed without the delay required for the call to be transferred to a human operator.

These and other advantages of the present invention are obtained by a novel automatic interactive voice communication system apparatus, computer program and method of operation that provides for automatic screening of voice recognition accuracy and for limited human intervention in the automatic interactive voice communication process without transferring the call. The accuracy of the automatic process is thereby improved without the need to abort the automatic process and transfer the call to a human operator.

An automatic voice system of a first aspect of the present invention for receiving a voice input from a caller and for transmitting a voice message to the caller includes:

automatic means for receiving a call and storing a callers voice input;

voice recognition means for analyzing the voice input and generating a voice recognition result;

screening means for recognizing when the voice recognition means has difficulty in recognizing intelligible information in the callers voice input, the screening means including screener interface means for reproducing the voice request when the voice recognition means has difficulty in recognizing an intelligible request in the callers voice request and for receiving a recognition result entered by a human voice inspector (hereinafter referred as a screener) of the callers voice input; and switching means for switching the call from the automatic means for receiving a call to an operator interface means by which an operator and the caller directly talk with each other.

In one embodiment such a system, the automatic voice response means transfers the received voice of the caller to the voice recognition means, and the voice recognition means generates the voice recognition result and transmits the voice recognition result to the automatic voice response means. The automatic voice response means transmits a confirmation message based on the voice recognition result to the caller. The confirmation message may be in the form of a question capable of being answered by a binary answer of yes or no. When a response by the caller to the confirmation message is negative, the automatic voice response means supplies the voice of the caller already received to the screener interface means, where it is heard by a screening person. The screener provides an input at the screener interface representative of the intelligible content of the callers voice. The screener's input is used by the system in place of the previous voice recognition result and generates a new confirmation message question therefrom. The new confirmation message based on the input from the screener is sent to the caller. When a response by the caller to the new confirmation message is negative, the line exchanging means switches the voice connection of the caller from the automatic voice response means to the operator interface means. In the above described embodiment, the screening means recognizes that the voice recognition means is having difficulty in recognizing an intelligible request in the callers voice input by monitoring the callers response to the confirmation question.

Thus even if the voice recognition means should fail to recognize the an intelligible request in the voice input of the caller, the operator does not need to deal with the caller at this step in the method of the invention. Instead a screener who is specialized in separating background noise from voice utterance of a caller may recognize an intelligible request in the voice of the caller already received. Accordingly, processing by the automatic voice response system appears to the caller to be continuous, and reliability of the automatic voice response system appears high to the caller. Furthermore, since the screener hears merely a replay of the voice request of the caller and enters a recognition result into the screener interface, the screener is not required to enter into a conversation with the caller and need not have the special conversational skills that are needed to satisfy customers. Accordingly, the invention can be expected to reduce labor costs in total.

As a matter of course, the operator may serve also as the screener. The voice input of the caller is then replayed at the workstation of the operator and the operator enters discernible intelligible information detected in the callers voice into the screener interface which also may be the same means as used by the operator when entering information after a call has been transferred to the operator. So long as the number of times that a caller is asked to repeat a voice request is reduced, even though the number of cases in which the voice request of the caller is replayed to the screener increases, satisfaction of the caller in the automatic voice response system will be increased.

In another aspect of the invention, instead of transferring the voice of the caller to the screener as an error in response to a negative response from the caller, the voice of the caller may be transferred to the screener as an error in that the voice recognition means is able to itself determine that it fails to recognize intelligible information in a voice request of the caller.

In an embodiment of this aspect, voice recognition includes a word list of words to be recognized. This word list includes proposed words corresponding to expected voice input such as catalog order items. The voice recognition means accesses the word list while generating a recognition result. Being limited to a smaller vocabulary, improved recognition precision results.

The automatic interactive voice system according to a still further embodiment of the present invention further comprises a list of words to be recognized, which is referred to by the recognition means and also made available to the screener at the screener interface means. When the voice recognition means recognizes intelligible information in the voice of the caller for the predetermined question item, the voice recognition means refers to the word list and selects a word or a word phrase from proposed words corresponding to the question item, while generating a recognition result. In such way, the recognition precision is further increased. Likewise when the voice of a caller is replayed to a screener, the screener can enter a recognition result into the screener interface simply by referring to the list of words to be recognized and then selecting a word from some proposed words in the word list. Thus, the need for advanced training of the screener and uncertainty of the screener in a callers response can be significantly reduced.

A method is known from Japanese Patent Laid-Open No. 9(1997)-82688, in which when voice recognition attempts concerning the same voice input item is iterated, a word denied by the caller as the intended one based on an erroneous recognition result is excluded from the list of proposed words in voice recognition to be subsequently performed. This method can be applied to a system for dealing for a caller according to the present invention. In an automatic voice response system according to another embodiment of the present invention, when the voice recognition means repeats voice recognition steps relating to a predetermined question item, the voice recognition means excludes a word previously denied in a response from the caller from proposed words corresponding to a question item. When the caller responds negatively a predetermined number of times, the automatic voice response means supplies the voice item of the caller already received to the screener interface means as well as the history of words denied by the caller. In this method, if the screener recognizes any intelligible information in the voice of the caller, the screener can select a word from a reduced list of proposed words remaining after the denied words are excluded. Accordingly, recognition precision, or in other words accuracy, can be increased and recognition difficulty for the screener can be further reduced.

When a recognition result is selected from some proposed words during automated voice recognition, a method is known, in which recognition is made based on recognition probabilities relating to the proposed words. This method can also be applied to a system for dealing with a caller according to the present invention. Another aspect of the unmanned system for dealing a caller according to the present invention comprises automatic voice response means for receiving a voice input from a caller and for transmitting a message to the caller; voice recognition means for analyzing the voice and for generating a voice recognition result; screener interface means for reproducing the voice and for entering the voice recognition result by a screener thereof; operator interface means by which an operator and the caller directly talk with each other; line exchanging means for switching a conversation with the caller between the automatic voice response means and the operator interface means; and a word list to be recognized, which is referred to by the voice recognition means and the screener interface means. In this embodiment, the automatic voice response means transfers the voice input received from the caller to the voice recognition means, and the voice recognition means generates recognition results of a predetermined number in an order of higher recognition probability from proposed words relating to the received voice of the caller and transfers the recognition results to the automatic voice response means; when a recognition probability of a certain recognition result is higher than predetermined values of recognition probabilities of other recognition results, the automatic voice response means transmits a confirmation message to the caller based on the recognition result; when a response of the caller to the confirmation message is negative, the automatic voice response means supplies the voice of the caller already received to the screener interface means; when the recognition probabilities of the plurality of recognition results are higher than predetermined values of recognition probabilities of other recognition results, a confirmation message based on the recognition result of the highest recognition probability among the plurality of recognition results is transmitted to the caller; when a response of the caller to the confirmation message is negative, a confirmation message based on the recognition result of the second highest recognition probability is transmitted to the caller; when all of the responses of the caller to the confirmation messages based on the plurality of recognition results are negative, the automatic voice response means supplies the voice of the caller already received to the screener interface means, when all of the recognition probabilities of the recognition result is lower than predetermined values of recognition probabilities of other recognition results, the automatic voice response means supplies the voice of the caller already received to the screener interface means, the automatic voice response means receives the voice recognition result from the screener interface means, and the automatic voice response means transmits a confirmation message based on this voice recognition result to the caller; and when a response of the caller to this confirmation message is negative, the line switching means switches a conversation with the caller from the automatic voice response means to the operator interface means.

An automatic voice response system of still another embodiment of the present invention has a feature wherein the screener interface means commands the line switching means to switch the conversation with the caller from the automatic voice response means to the operator interface means. In such way, when the screener decides that an erroneous recognition is likely to occur permanently, because other voices are superimposed on the caller's voice such as due to a TV turned on behind the caller or because of a poor voice quality of the caller, the screener can act to switch the conversation with the caller from the automatic voice response means to the operator interface means. On the other hand, when the screener determines that the erroneous recognition is temporary error recognition due to mixture of temporary background noise or the caller clearing his or her throat, the screener can allow another recognition attempt to proceed.

An automatic voice response method of the present invention comprises a receiving step for receiving a voice from a caller; an automatic recognition step for analyzing the voice and for generating a voice recognition result; a confirmation message transmitting step for transmitting a confirmation message based on the recognition result to the caller; a response receiving step for receiving a response relating to the confirmation message from the caller; a voice transfer step for returning to the receiving step for receiving a voice from a caller when the response is negative, and for supplying the voice of the caller to a screener when an affirmative response is not obtained by iterating the receiving step for a predetermined number of times; another confirmation message transmitting step for transmitting another confirmation message based on a recognition result by the screener; another response receiving step for receiving another response relating to another confirmation message from the caller; and a switching step for switching a conversation with the caller from the automatic voice response means to an operator of the screener interface means when another response is negative.

An automatic voice response method of an embodiment of the present invention comprises: a receiving step for receiving a voice from a caller; a recognition result generating step for generating recognition results of a predetermined number in an order of higher recognition probability from proposed words relating to the received voice of the caller; an automatic recognition step for transmitting a confirmation message based on this recognition result to the caller, for receiving a response of the caller relating the confirmation message, for supplying the voice of the caller to a screener interface section when the response of the caller is negative, for transmitting a confirmation message based on the recognition result of the highest recognition probability among the plurality of specified recognition results to the caller when recognition probabilities of a plurality of specified recognition results are higher than predetermined values of recognition probabilities of other recognition results other than the specified recognition results, for receiving a response relating to the confirmation message from the caller, for transmitting a confirmation message based on the recognition result having the second highest recognition probability when the response is negative, for receiving a response from the caller relating to the confirmation message, and for supplying the voice of the caller to the screener interface means when all of the responses of the caller to the confirmation messages based on the plurality of recognition results are negative, for supplying the voice of the caller to the screener interface means when all of the recognition probabilities of the recognition results are lower than predetermined values of the other recognition probabilities; and a screener recognition step for transmitting a confirmation message based on a recognition result by the screener, for receiving a response of the caller relating to the confirmation message, and for switching a talking of the caller to a talking in which the caller speaks directly to an operator when the response is negative.

BRIEF DESCRIPTION OF THE DRAWINGS

For a more complete understanding of the present invention and the advantages thereof, reference is now made to the following description taken in conjunction with the accompanying drawings identified below.

FIG. 3 is a flowchart showing operation of the automatic voice response system according to another embodiment of the present invention.

DETAILED DESCRIPTION OF THE PREFERRED EMBODIMENTS

Figure 1:
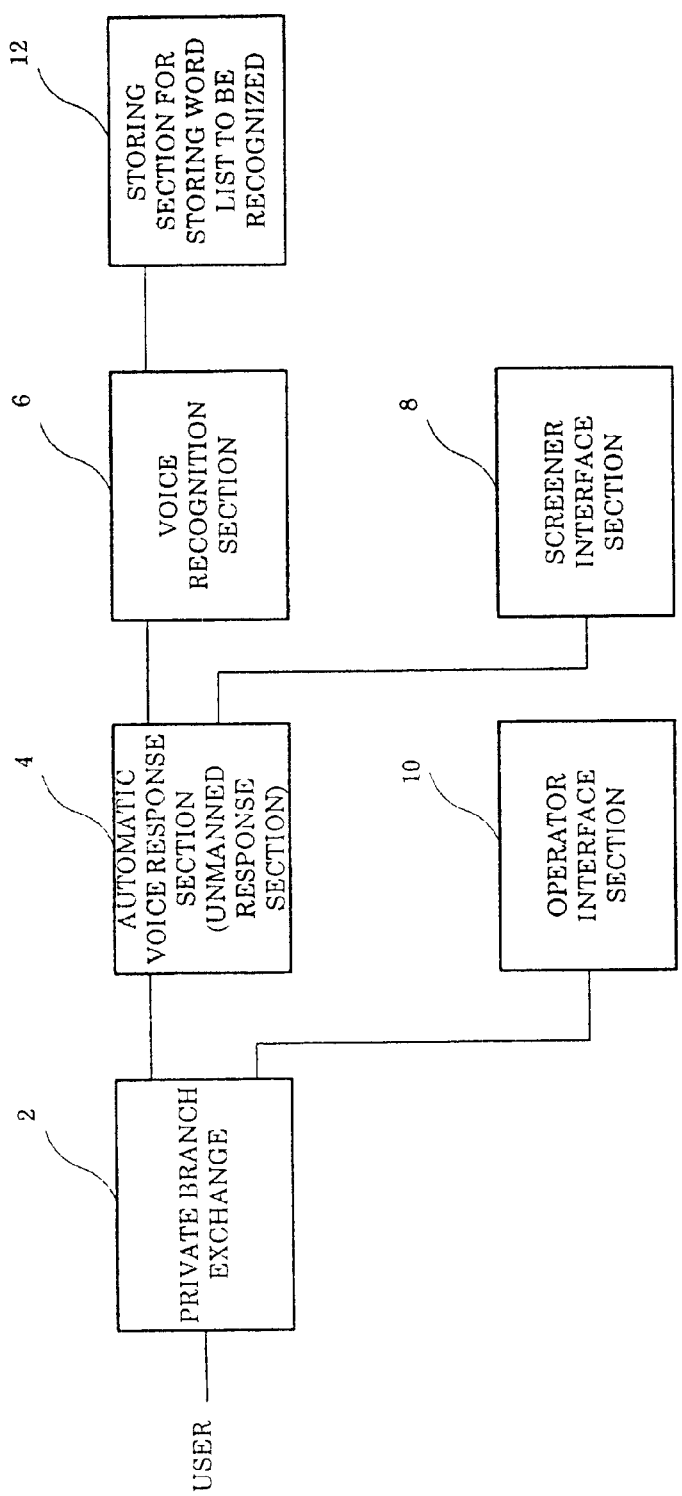
FIG. 1 is a block diagram showing an automatic voice response system according to an embodiment of the present invention.
Figure 2:
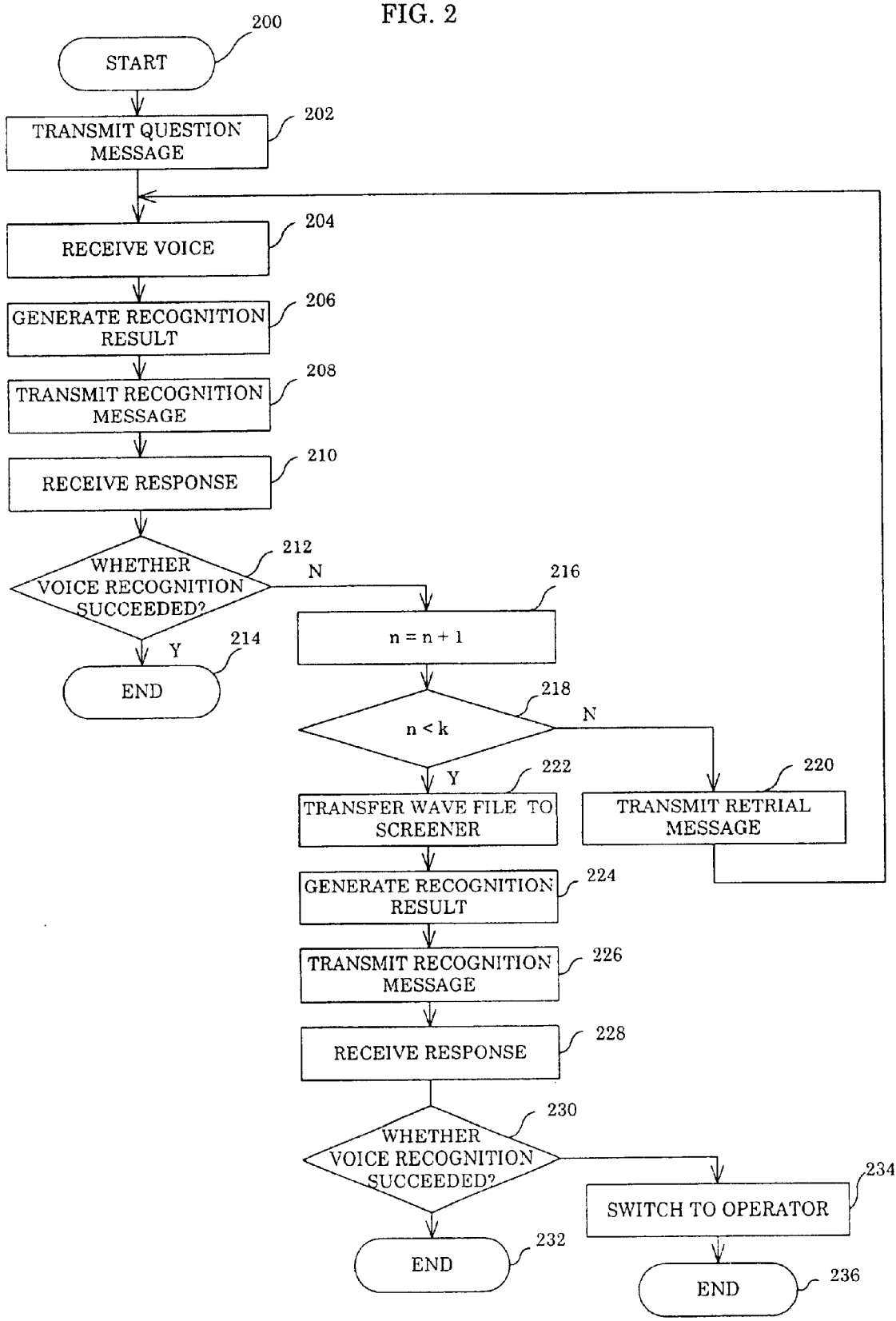
FIG. 2 is a flowchart supporting the description of operation of the automatic voice response system according to the embodiment of the present invention.

FIG. 1 is a block diagram showing an automatic voice interaction system according to a preferred embodiment of the present invention. An automatic voice response system 1 comprises a private branch exchange 2, an automatic voice response section 4, a voice recognition section 6, a screener interface section 8, an operator interface section 10 and a storing section 12 for storing a list of words to be recognized and for storing the recognized intelligible information recognized in caller voice input by the voice recognition section 6 and by the screener and/or the operator,(hereinafter referred to as a storing section 12). Major logic of the automatic voice interaction system including screening means is preferably implemented as programmed logic in a computer. For example, the automatic voice response section 4, the voice recognition section 6 and the storing section 12 are preferably implemented in a computer having significant processing power and storage capacity in order to perform the recognition functions efficiently and communicate the resulting catalog orders or other information to shipping and billing departments. These departments may themselves by merely computer workstations which coordinate their respective functions in a business enterprise. The screening means is also preferably a computer workstation having a keyboard and display to implement the screener interface section 8 for use by the screener. All of the logic embodying the method described hereinafter with respect to FIGS. 2 and 3 is preferred to be implemented in computer program logic which runs in the computer or computers of the automatic voice interaction system. Teachings of implementation of logic in computer programs and storage on computer readable media is shown in FIG. 9 and described in column 7 of U.S. Pat. No. 6,013,107 which patent is incorporated herein by reference in its entirety.

The private branch exchange 2 switches a conversation with a caller between the automatic voice response section 4 and the operator interface section 10. The automatic voice response section 4 includes circuits and logic for receiving voice input from the caller, and for storing messages to be synthesized and sent to the caller in the form of question messages. The response section 4 also includes circuits and logic for transmitting the question messages to the caller, and for transferring recorded voice clips of the caller's voice either to the voice recognition section 6 or to the screener interface section 8. The response section 4 also has circuits and logic for receiving a recognition result from the voice recognition section 6 or from the screener interface section 8. The voice recognition section 6 receives the caller's voice packet or clip from the automatic voice response section 4, and generates a recognition result, which it returns to the automatic voice response section 4 which uses the recognition result to generate a confirmation query.

The screener interface section 8 in the preferred embodiment comprises, a speaker or a headphone, a keyboard and a display. A screener at the screener interface section 8 listens to the caller's voice transferred from the automatic voice response section 4 using the speaker or headphone, and enters a recognition result by an input device such as the keyboard while confirming the correct entry of the recognition result use of the display. The automatic voice response section 4 transmits the recognition result received either from the voice recognition section 6 or from the screener interface section 8 to other devices such as an order acceptance processing system. The operator interface section 10 includes a telephone receiver and transmitter for talking directly with the caller. The receiver and transmitter may be in the form of a speaker or a headphone, a microphone and/or a headset. The operator interface 10 will preferably also includes a keyboard for entering caller's order information and a display for confirmation. The operator interface section 10 also has circuits and logic for transmitting the caller's order entered with the keyboard to other devices such as an order acceptance processing system or storage for later further processing such as in the case of a census or survey or warrantee response. Such storage may in the preferred embodiment be in the storing section 12 which also stores a list of proposed words to be recognized as intelligible information in the caller's voice input corresponding to a question item put to the caller. An example list of proposed words appear in Table 1.

TABLE 1

| Number of question item | Word to be recognized |
|---|---|
| 1 | Yes, No |
| 2 | (six-digit number) |
| 3 | Tokyo, Osaka, . . . (specifying branch office) |
| 4 | Melon, Lemon, Orange, . . . (specifying goods) |
| . . . | |

FIG. 2 is a flowchart supporting the following explanation of steps performed while dealing with a question item in the automatic voice response system of FIG. 1. In step 200, a caller calls the automatic voice response system 1, thus starting the process of the instant invention. A connection between the caller and the automatic voice response section 4 via the private branch exchange (hereinafter referred to as PBX) is made. In step 202, the automatic voice response section 4 transmits a question message to the caller. In the case of telephone shopping, this question message is, for example, a member number, a name of goods, a goods number and the number of goods. As an example of the question message, a phrase expressing "Please say the name of goods." is employed. Such message may be recorded in advance, because it is a fixed message. In step 204, the automatic voice response section 4 receives a response voice clip or packet to the question message from the caller, and transfers the response voice clip to the voice recognition section 6 in a predetermined format such as a WAVE file. It is assumed that this response message is "melon" in the examples of the Table 1. In step 206, the voice recognition section 6 refers to the table stored in the storing section 12, and generates a recognition result as, for example, text data. The voice recognition section 6 transmits the recognition result to the automatic voice response section 4. In step 208, the automatic voice response section 4 synthesizes a confirmation message based on the recognition result received from the voice recognition section 6, and transmits the confirmation message to the caller. It is assumed that this confirmation message is, for example, "Do you want to order a melon?" In step 210, the automatic voice response section 4 receives an uttered voice response to the confirmation message from the caller. This confirmation response may be transmitted in the form of voice as described above or by a push button of a telephone previously determined. In step 212, if the response from the caller to the confirmation message is affirmative, it is judged that the voice recognition by the voice recognition section 6 was performed successfully. In step 214, processing concerning the question item is finished, and the automatic voice response section 4 transmits the recognition result to a device which executes other processing or simply to storage for later processing. The method of the invention then advances to a next communication processing, for example, processing concerning a next question item.

In step 212, if the confirmation response from the caller to the confirmation message is negative, an iteration counter in the voice response section is incremented. The iteration counter accumulates a count representing the number of times that recognition of a voice input item by the voice recognition section 6 has been attempted without positive confirmation by the caller. In step 218, when the counted value n is equal to a predetermined value k or less, for example, 2 or less, processing advances to step 220. In step 220, the automatic voice response section 4 transmits a retrial message to request a restatement of the voice utterance by the caller, and returns its processing to step 204. This retrial message is, for example, "Recognition failed. Say it again, please." In the voice recognition performed for the second time for the same item, the voice recognition section 6 excludes words from a second recognition result, which the caller has denied in previous confirmation responses and selects a second recognition result from among remaining proposed words.

In step 218, if the counted value k of the iteration counter is larger than k, the process advances to step 222, where the automatic voice response section 4 transfers to the screener interface section 8, a WAVE file of the caller's most recent voice clip received as well as the words included in the most recent recognition result which have been denied by the caller. In step 224, the screener interface section 8 reproduces the WAVE file through its speaker or the headphone, and refers to the table stored in the storing section 12 for storing a word list to be recognized. Then, the screener interface section 8 displays on the display, those proposed words other than the words denied by the caller. The screener then selects a word from the proposed words displayed which the screener recognizes as an intelligible word uttered by the caller and enters a number corresponding to this selected word using the keyboard. The screener interface section 8 transmits text data of the word corresponding to the number as the recognition result to the automatic voice response section 4. When the question item is, for example, a number such as a member number and a number of goods and when the question item is a person's name having no proposed word, the screener may directly enter the recognition result from the keyboard. Furthermore, when the screener decides that an erroneous recognition is likely to occur permanently, because other voices are superposed on the caller's voice due to a TV turned on behind the caller or because of poor voice quality of the caller, and not because of temporary error recognition due to a mixture of temporary sounds or the caller clearing his or her throat, the screener, by operation of the screener interface, may command the PBX 2 to switch the conversation with the caller from the automatic voice response section 4 to the operator interface section 10. This allows the operator to converse directly with the caller and provide spontaneous suggestions and questions. Alternatively, the screener may be assigned to be on duty at the screener interface only during time periods when large numbers of calls are coming in such as immediately after broadcast of TV advertisements. At other times and after on-duty hours of the screener, all calls to be received by the screener may be dealt with by the operator. In this case, although the operator can deal with the calls received by the system using manual conversation methods, the operator may allow the automated conversation to proceed as enhanced using the screener interface of the invention and only switch the conversation to manual mode when it is impossible to recognize intelligible information the caller's voice inputs in the automatic conversation mode. By switching to manual conversation mode, the operator can ask questions which lead to clarifying responses from the caller. The screen of the operator interface section a displays a message to alert the operator whenever the operator becomes responsible for a conversation, whether as a screener or by PBX switched transfer of the call to the operator for manual mode handling.

In step 226, the automatic voice response section 4 transmits a confirmation message to the caller in the same manner as that of step 208. In step 228, the automatic voice response section 4 receives a confirmation response from the caller to the confirmation message in the same manner as that of step 210. Step 228 may be skipped if necessity arises, such as when the caller fails to respond and the call must be switched to the operator at block 234. In step 230, if the response is affirmative, it is judged that the voice recognition by the screener was done successfully. In step 232, processing relating to the question item is finished in the same manner as that of step 214.

In step 230, if the response is negative, the automatic voice response section 4 sends a line switching command to the PBX 2, the PBX 2 switches the conversation with the caller from the automatic voice response section 4 to the operator interface section 10. Thereafter, the operator directly deals with the caller.

FIG. 3 is a flowchart supporting the following description of the method of operation of another embodiment of the automatic voice response system according to the present invention, which employs an evaluation as to a value of a recognition probability. Steps 300 to 304 are identical to steps 200 to 204 of FIG. 2. In step 306, the voice recognition section 6 refers to a table stored in the storing section 12 for storing a word list to be recognized, and generates recognition results of a predetermined number in the order of higher recognition accuracy probability. Then, the voice recognition section 6 transmits the recognition results to the automatic voice response section 4. In this embodiment, it is assumed that three recognition results "a," "b" and "c" are generated. In step 308, when the recognition probability of the recognition result "a" is significantly higher than other recognition results "b" and "c" and is a predetermined value or more, the recognition result is decided to be "a," and the automatic voice response section 4 initiates confirmation of the recognition result "a" by the caller by transmitting a confirmation message to the caller. The operations in steps 308 and 310 are identical to those in steps 208 and 210 of FIG. 2. In step 312, if the response from the caller to the confirmation message is affirmative, the recognition result is confirmed to be "a," and an automatic data acquisition operation is finished in step 314. If the response is negative, the automatic voice response section 4 transfers a WAVE file of the caller's voice to the screener interface section 8 in step 324. The method of operation in step 324 is identical to those of steps 222 to 234 of FIG. 2. When a recognition precision of the voice recognition section 6 is sufficiently high, the method of operation may skip step 312 and advance to subsequent processing at step 314 without the confirmation of the caller.

In step 308, when the recognition probability of the recognition result "a" and the recognition probability of the recognition result "b" are nearly identical to each other and exceed a predetermined value, one recognition result showing a slightly higher recognition probability than that of the other is decided to be a true recognition result. In this example of the alternate embodiment, "a" is decided to be the true recognition result in step 316, and the automatic voice response section 4 confirms the recognition result by transmitting the recognition result to the caller in a confirmation question soliciting a confirming response. Such situation may occur when two words pronounced in the similar tone are registered in the word list to be recognized. In step 318, if a response from the caller to the confirmation message is affirmative, the recognition result is confirmed to be "a," and the operation is finished in step 314. If the response of the caller is negative, the recognition result is decided at block 320 to be "b," and the automatic voice response section 4 permits the caller to confirm this second recognition result by transmitting a confirmation message to the caller, also in step 320. In step 322, if the response from the caller to the confirmation message is affirmative, the recognition result is confirmed as "b," and the operation ends at step 314. If the response of the caller to the confirmation message is negative, the process advances to step 324, and the process moves to recognition by the screener. When the recognition precision of the voice recognition section 6 is sufficiently high and a possibility that the recognition result is decided to be "a" or "b" is very high, steps 320 and 322 may be omitted. In such circumstances, the method of the invention ends at step 314 with "b" as the recognized input without further confirmation.

In step 308, when the recognition probabilities of the recognition results "a," "b" and "c" are all equal to a predetermined value or less, the procedure advances to step 324, and the method of operation of the invention moves to recognition by the screener. It is considered that in such situation, though the recognition probability of the recognition result is low, the screener has the capability to mentally separate out noises from the words spoken by the caller. Accordingly, the screener presumably can recognize the caller's voice utterances in many cases. In such cases, the recognition results calculated by the voice recognition section 6 may also be provided to the screener to assist the screener in recognizing the callers utterance.

According to the present invention, an automatic voice response system is provided, which is capable of reducing the operator's load in handling callers who can not be understood by the automated communication system. Further, the present invention reduces the necessity for a caller to repeatedly pronounce voice input.

Although the preferred embodiments of the present invention have been described in detail, it should be understood that various changes, substitutions and alternations can be made therein without departing from the spirit and scope of the invention as defined by the following claims.

What is claimed is:

1. Automatic voice interaction apparatus for receiving a voice reguest from a caller and for transmitting a voice message to the caller comprising;
   switching means for receiving a call and for connecting the call to;
   automatic voice response means for storing the caller's voice utterance and for synthesizing a voice message to the caller;
   voice recognition means connected to receive the caller's voice utterance for analyzing the voice utterance and for generating a voice recognition result, the voice recognition means connected to send the voice recognition result to the automatic voice response means for synthesis into a voice message to the caller;
   screening means connected to receive stored voice utterances and reproduce voiced audio from a stored voice utterance when the caller responds negatively to a confirmation voice message synthesized by the voice response means from the voice recognition result generated by the voice recognition means, the screening means including means for receiving a voice recognition result entered by a person screening the reproduced voiced audio, the screening means connected to send the entered recognition result to the automatic voice response means for synthesis into a voice message to the caller;
   operator interface means by which an operator and the caller directly talk with each other, the screening means controlling the switching means to switch a call from the automatic voice response means to the operator interface means.

2. The automatic voice interaction apparatus of claim 1 further comprising:
   input means in the screening means for receiving input from the person screening the reproduced voiced audio for controlling the switching means to switch a call from the automatic voice response means to the operator interface means.

3. The automatic voice interaction apparatus of claim 1 further comprising:
   logic means in the screening means for controlling the switching means to switch a call. from the automatic voice response means to the operator interface means when the caller has responded negatively to a confirmation voice message synthesized by the voice response means from a recognition result generated by the voice recognition means and has responded negatively to a confirmation voice message synthesized by the voice response means from a recognition result entered by the person screening the reproduced voiced audio.

4. The automatic voice interaction apparatus of claim 1 further comprising:
   storage means for storing a list of words to be recognized, the voice recognition means selecting a word from proposed words in the list of words corresponding to an intelligible response to a synthesized question message to generate a recognition result.

5. The automatic voice interaction apparatus of claim 1 further comprising;
   logic means in the screening means for delaying reproducing voiced audio from a stored voice utterance when the voice recognition means has generated a plurality of recognition results from a voice utterance until the caller responds negatively to a confirmation voice message synthesized by the voice response section from a highest recognition probability recognition result generated by the voice recognition means and the caller responds negatively to a confirmation voice message synthesized by the voice response section from a second highest recognition probability recognition result generated by the voice recognition means.

6. The automatic voice interaction apparatus of claim 1 further comprising:

logic means in the screening means for reproducing voiced audio from a stored voice utterance for a person screening the reproduced voiced audio without synthesizing a confirmation voice message when the voice recognition means has generated a plurality of recognition results from a caller's voice utterance and a value of a recognition probability of each of the plurality of recognition results generated by the voice recognition means from the caller's voice utterance all are less than a predetermined value.

7. Method of automatic voice interaction for receiving a voice request from a caller and for transmitting a voice message to the caller comprising the steps of:

receiving a call at automatic voice response means;

storing the caller's voice utterance;

analyzing the caller's voice utterance in voice recognition means for intelligible information;

generating a voice recognition result containing the intelligible information;

synthesizing the voice recognition result into a voice message to the caller;

and when the caller responds negatively to a confirmation voice message synthesized by the voice response means from the voice recognition result generated by the voice recognition means:

reproducing at a screener interface, voiced audio from the stored voice utterance;

receiving at the screener interface, a screener's recognition result entered by a person screening the reproduced voiced audio;

synthesizing the screener's recognition result into a voice message to the caller: and controlling switching means to switch a call from the automatic voice response means to an operator interface for allowing an operator to speak directly with the caller when the caller responds negatively to the synthesized voice message based upon the screener's recognition result.

8. Method of claim 7 further comprising:

receiving input from a person screening the reproduced voiced audio at the screener interface for controlling the switching means to switch a call from the automatic voice response means to the operator interface means.

9. Method of claim 7 further comprising:

selecting from a stored list of proposed words to be recognized, a word from proposed words in the list of words corresponding to an intelligible response to a synthesized question message to generate a recognition result.

10. Method of automatic voice interaction for receiving a voice request from a caller and for transmitting a voice message to the caller comprising the steps of:

receiving a call at automatic voice response means;

storing the caller's voice utterance;

analyzing the caller's voice utterance in voice recognition means for intelligible information;

generating a plurality of voice recognition results from the caller's voice utterance;

transmitting a confirmation message based on the recognition result having a highest recognition probability to the caller when a recognition probability of more than one of the recognition results are higher than a predetermined value;

transmitting a confirmation message based on the recognition result of the second highest recognition probability to the caller when a response of the caller to the confirmation message based on the recognition result of the highest recognition probability is negative;

reproducing at a screener interface, voiced audio from the stored voice utterance when all of the responses of the caller to the confirmation messages based on the plurality of recognition results having recognition probabilities greater than the predetermined value are negative;

receiving at the screener interface, a screener's recognition result entered by a person screening the reproduced voiced audio;

synthesizing the screener's recognition result into a voice message to the caller; and controlling switching means to switch a call from the automatic voice response means to an operator interface for allowing an operator to speak directly with the caller when the caller responds negatively to the synthesized voice message based upon the screener's recognition result.

11. Method of automatic voice interaction for receiving a voice request from a caller and for transmitting a voice message to the caller comprising the steps of:

receiving a call at automatic voice response means;

storing the caller's voice utterance;

analyzing the caller's voice utterance in voice recognition means for intelligible information;

generating a plurality of voice recognition results from the caller's voice utterance;

reproducing at a screener interface, voiced audio from stored voice utterance when a recognition probability of each of the recognition results is lower than a predetermined value;

receiving at the screener interface, a screener's recognition result entered by a person screening the reproduced voiced audio;

synthesizing the screener's recognition result into a voice message to the caller; and controlling switching means to switch a call from the automatic voice response means to an operator interface for allowing an operator to speak directly with the caller when the caller responds negatively to the synthesized voice message based upon the screener's recognition result.

12. A computer program product comprising: a computer useable medium having computer readable program code means embodied therein for operating an automatic voice interaction system which receives a voice request from a caller and transmits a voice message to the caller comprising:

program code means for receiving a call at an automatic voice response system;

program code means for storing the caller's voice utterance;

program code means for analyzing the callers voice utterance for intelligible information;

program code means for generating a voice recognition result containing the intelligible information;

program code means for synthesizing the voice recognition result into a voice message to the caller;

program code means for reproducing at a screener interface, voiced audio from stored voice utterance when the caller responds negatively to a confirmation voice message synthesized by the voice response means from the voice cognition result generated by the voice recognition means;

program code means for receiving at the screener interface, a screener's recognition result entered by a screener of the reproduced voiced audio;

program code means for synthesizing the screener's recognition result into a voice message to the caller; and program code means for controlling switching means to switch a call from the automatic voice response means to an operator interface for allowing an operator to speak directly with the caller when the caller responds negatively to the synthesized voice message based upon the screener's recognition result.

13. Computer program product of claim 12 further comprising:

program code means for receiving input at the screener interface for controlling the switching means to switch a call from the automatic voice response means to the operator interface means.

14. A computer program product comprising:

a computer useable medium having computer readable program code means embodied therein for operating an automatic voice interaction system which receives a voice request from a caller and transmits a voice message to the caller comprising:

program code means for receiving a call at an automatic voice response system;

program code means for synthesizing a question message for transmission to the caller;

program code means for storing the caller's voice utterance which follows the question message;

program code means for analyzing the caller's voice utterance for intelligible information by selecting from a stored list of proposed words to be recognized, a word from proposed words in the list of words corresponding to an intelligible response to the synthesized question message;

program code means for generating a voice recognition result corresponding to the intelligible information;

program code means for synthesizing the voice recognition result into a confirmation voice message to the caller;

program code means for reproducing at a screener interface, voiced audio from stored voice utterance when the caller responds negatively to the confirmation voice message;

program code means for receiving at the screener interface, a screener's recognition result entered by a screener of the reproduced voiced audio;

program code means for synthesizing the screener's recognition result into a confirmation voice message to the caller; and program code means for controlling switching means to switch a call from the automatic voice response means to an operator interface for allowing an operator to speak directly with the caller when the caller responds negatively to the synthesized confirmation voice message.

15. A computer program product comprising computer readable program code means for operating an automatic voice interaction system which receives a voice request from a caller and transmits a voice message to the caller comprising:

program code means for receiving a call at an automatic voice response system;

program code means for storing the caller's voice utterance;

program code means for analyzing the caller's voice utterance for intelligible information program code means for generating a plurality of voice recognition results corresponding to the intelligible information;

program code means for transmitting a confirmation message based on the recognition result having a highest recognition probability to the caller when a recognition probability of more than one of the recognition results are higher than a predetermined value;

program code means for transmitting a confirmation message based on the recognition result of the second highest recognition probability to the caller when a response of the caller to the confirmation message based on the recognition result of the highest recognition probability is negative;

program code means for reproducing at a screener interface, voiced audio from the stored voice utterance when all of the responses of the caller to the confirmation messages based on the plurality of recognition results having recognition probabilities greater than the predetermined value are negative;

program code means for receiving at the screener interface, a screener's recognition result entered by a screener of the reproduced voiced audio;

program code means for synthesizing the screener's recognition result into a confirmation voice message to the caller; and program code means for controlling switching means to switch a call from the automatic voice response means to an operator interface for allowing an operator to speak directly with the caller when the caller responds negatively to the synthesized confirmation voice message.

16. A computer program product comprising computer readable program code means for operating an automatic voice interaction system which receives a voice request from a caller and transmits a voice message to the caller comprising:

program code means for receiving a call at an automatic voice response system;

program code means for storing the callers voice utterance;

program code means for analyzing the caller's voice utterance for intelligible information.

program code means for generating a plurality of voice recognition results corresponding to the intelligible information:

program code means for reproducing at a screener interface, voiced audio from the stored voice utterance when a recognition probability of each of the voice recognition results is lower than a predetermined value;

program code means for receiving at the screener interface, a screener's recognition result entered by a screener of the reproduced voiced audio;

program code means for synthesizing the screener's recognition result into a confirmation voice message to the caller; and program code means for controlling switching means to switch a call from the automatic voice response means to an operator interface for allowing an operator to speak directly with the caller when the caller responds negatively to the synthesized confirmation voice message.

17. An automatic voice response system comprising:

automatic voice response means for receiving a voice from a caller and for transmitting a message to the caller;

voice recognition means for analyzing the voice and for generating a voice recognition result;

screener interface means for reproducing the voice and for entering the voice recognition result by a screener thereof;

operator interface means by which an operator and the caller directly talks with each other; and line exchanging means for switching a talking with the caller between the automatic voice response means and the operator interface means, wherein the automatic voice response means transfers the voice of the caller to the voice recognition means, the voice recognition means generates the voice recognition result to transmit it to the automatic voice response means, and the automatic voice response means transmits a confirmation message based on the voice recognition result to the caller;

when a response by the caller to the confirmation message is negative, the automatic voice response means supplies the voice of the caller already received to the screener interface means, the automatic voice response means receives the voice recognition result from the screener interface means to transmit the confirmation message based on the voice recognition result to the caller; and when the response by the caller to the confirmation message is negative, the line exchanging means switches the talking of the caller from the automatic voice response means to the operator interface means.

* * * * *

UNITED STATES PATENT AND TRADEMARK OFFICE
CERTIFICATE OF CORRECTION

PATENT NO. : 6,584,180 B2
DATED : June 24, 2003
INVENTOR(S) : Kazuo Nemoto

It is certified that error appears in the above-identified patent and that said Letters Patent is hereby corrected as shown below:

Title page,
Item [30], Foreign Application Priority Data, should read as follows:
-- (30) Foreign Application Priority Data
   Jan. 26, 2000 (JP).....................2000-16549--

Item [56], Reference Cited, U.S. PATENT DOCUMENTS, should include:
-- 6,044,142A   3/2000   Hammarstrom et al.   379/223 --;
also include:
-- FOREIGN PATENT DOCUMENTS
 10322450 1998 (JP)     H04m--

Item [74], *Attorney, Agent or Firm,* should read:
-- (74) *Attorney, Agent or Firm*........Karl O. Hesse --

Signed and Sealed this

Eighteenth Day of May, 2004

JON W. DUDAS
*Acting Director of the United States Patent and Trademark Office*